(12) United States Patent
Messick, Jr.

(10) Patent No.: US 12,091,256 B2
(45) Date of Patent: Sep. 17, 2024

(54) MATERIAL BUILDUP RESISTANT SPROCKET

(71) Applicant: Cambridge International, Inc., Cambridge, MD (US)

(72) Inventor: George H. Messick, Jr., Cambridge, MD (US)

(73) Assignee: Cambridge International, Inc., Cambridge, MD (US)

( * ) Notice: Subject to any disclaimer, the term of this patent is extended or adjusted under 35 U.S.C. 154(b) by 86 days.

(21) Appl. No.: 17/945,071

(22) Filed: Sep. 14, 2022

(65) Prior Publication Data

US 2023/0084474 A1 Mar. 16, 2023

Related U.S. Application Data

(60) Provisional application No. 63/244,949, filed on Sep. 16, 2021.

(51) Int. Cl.
*B65G 23/06* (2006.01)
*B23F 19/10* (2006.01)

(52) U.S. Cl.
CPC ............. *B65G 23/06* (2013.01); *B23F 19/10* (2013.01)

(58) Field of Classification Search
CPC ......... B23F 19/10; B65G 15/62; B65G 17/08; B65G 39/02; B65G 39/20
USPC ................................. 198/791, 832, 834, 835
See application file for complete search history.

(56) References Cited

U.S. PATENT DOCUMENTS

| | | | |
|---|---|---|---|
| 4,308,019 A * | 12/1981 | Horkey | F16H 55/30 198/834 |
| D286,932 S | 11/1986 | Bode et al. | |
| 4,685,557 A | 8/1987 | Roinestad | |
| 4,741,430 A | 5/1988 | Roinestad | |
| 4,832,187 A | 5/1989 | Lapeyre | |
| 4,852,720 A | 8/1989 | Roinestad | |
| 4,989,723 A | 2/1991 | Bode et al. | |
| 5,083,659 A | 1/1992 | Bode et al. | |
| 5,105,938 A | 4/1992 | Tan | |
| 5,160,020 A | 11/1992 | Thomas, Sr. | |
| 5,174,439 A | 12/1992 | Spangler et al. | |
| 5,282,532 A | 2/1994 | Thomas, Sr. | |
| 5,449,063 A | 9/1995 | Thomas, Sr. | |

(Continued)

FOREIGN PATENT DOCUMENTS

| | | | |
|---|---|---|---|
| CN | 108455175 A * | 8/2018 | ............. B65G 17/12 |
| EP | 2474486 A1 | 7/2012 | |

(Continued)

*Primary Examiner* — Gene O Crawford
*Assistant Examiner* — Muhammad Awais
(74) *Attorney, Agent, or Firm* — Quarles & Brady LLP

(57) ABSTRACT

A sprocket configured for use with a conveyor belt and capable of resisting material buildup up is disclosed. The sprocket includes a sprocket body including a hub, a webbing, and a plurality of teeth. In one form, at least one tooth of the plurality of teeth defines a thickness in an axial direction that varies between an inner portion and an outer portion of the tooth. In another form, at least one tooth extends radially from a sprocket root near the webbing, the sprocket root including a curved base that extends axially away from the webbing to a lateral surface of the at least one sprocket tooth. In yet another form, a hub height is greater than a tooth thickness and the tooth thickness is greater than a web thickness.

11 Claims, 10 Drawing Sheets

(56) References Cited

U.S. PATENT DOCUMENTS

| | | | |
|---|---|---|---|
| 5,562,200 A | 10/1996 | Daringer | |
| 5,613,597 A | 3/1997 | Palmaer et al. | |
| 5,706,934 A | 1/1998 | Palmaer et al. | |
| 5,791,455 A * | 8/1998 | Clopton | B65G 17/24 198/779 |
| 5,816,988 A | 10/1998 | Daringer et al. | |
| 6,041,916 A | 3/2000 | Daringer et al. | |
| 6,146,299 A | 11/2000 | Harvey | |
| 6,279,726 B1 | 8/2001 | Etherington et al. | |
| 6,330,941 B1 | 12/2001 | Guldenfels | |
| 6,425,479 B1 | 7/2002 | Guldenfels et al. | |
| 6,516,944 B2 | 2/2003 | Guldenfels | |
| 6,766,899 B1 | 7/2004 | Guldenfels | |
| 7,565,967 B2 | 7/2009 | Maine, Jr. et al. | |
| 7,703,601 B2 | 4/2010 | DeLair et al. | |
| 7,753,193 B2 | 7/2010 | Kanaris | |
| 7,757,841 B2 | 7/2010 | Fandella | |
| 7,837,028 B2 | 11/2010 | Elsner | |
| 7,975,840 B2 | 7/2011 | Messick, Jr. et al. | |
| 8,172,069 B2 | 5/2012 | Prakasam | |
| 8,276,747 B2 | 10/2012 | Guldenfels et al. | |
| 8,424,676 B2 | 4/2013 | Jones et al. | |
| 8,544,637 B2 | 10/2013 | Fleig et al. | |
| 8,668,075 B2 | 3/2014 | Guldenfels et al. | |
| 8,776,989 B2 | 7/2014 | Guldenfels et al. | |
| 8,997,975 B2 | 4/2015 | Lucchi | |
| 9,061,829 B2 | 6/2015 | Salsone et al. | |
| 9,115,802 B2 | 8/2015 | Guldenfels et al. | |
| 9,422,111 B2 | 8/2016 | Matson et al. | |
| 9,475,642 B2 | 10/2016 | Messick, Jr. | |
| 9,555,970 B2 | 1/2017 | Franzoni et al. | |
| 9,663,297 B1 | 5/2017 | Steinhoff et al. | |
| 9,850,072 B2 * | 12/2017 | Lucchi | B65G 23/06 |
| 10,077,157 B2 * | 9/2018 | Soderstrom | B65G 23/06 |
| 10,577,183 B2 | 3/2020 | Perdue et al. | |
| 11,053,080 B2 | 7/2021 | Messick, Jr. | |
| 11,305,938 B2 | 4/2022 | Salsone et al. | |
| 2004/0222072 A1 * | 11/2004 | Verdigets | F16H 55/30 198/834 |
| 2005/0061633 A1 | 3/2005 | Vetter | |
| 2006/0163039 A1 | 7/2006 | Marshall et al. | |
| 2006/0252588 A1 | 11/2006 | Fandella | |
| 2007/0111833 A1 * | 5/2007 | Young | F16H 55/30 474/100 |
| 2007/0161443 A1 | 7/2007 | Krisl | |
| 2008/0190462 A1 | 8/2008 | Guldenfels et al. | |
| 2009/0000921 A1 * | 1/2009 | Guldenfels | B65G 17/08 198/834 |
| 2012/0037479 A1 * | 2/2012 | Lucchi | B65G 23/06 198/835 |
| 2013/0228421 A1 * | 9/2013 | Harrelson | B65G 23/06 198/834 |
| 2014/0346014 A1 * | 11/2014 | Andreoli | B65G 17/40 198/779 |
| 2015/0259150 A1 * | 9/2015 | Matson | B65G 23/06 198/834 |
| 2019/0106280 A1 * | 4/2019 | Gettig | B65G 23/06 |
| 2021/0231208 A1 * | 7/2021 | Boriack | B65G 23/06 |

FOREIGN PATENT DOCUMENTS

| | | | | |
|---|---|---|---|---|
| GB | 2481847 A * | 1/2012 | | B65G 23/06 |
| WO | WO-2021086166 A1 * | 5/2021 | | |

\* cited by examiner

MATERIAL BUILDUP RESISTANT SPROCKET

CROSS-REFERENCE TO RELATED APPLICATION

This application claims priority under 35 U.S.C. § 119 to U.S. Provisional Patent Application No. 63/244,949 filed on Sep. 16, 2021, the entire contents of which are incorporated herein by reference.

STATEMENT CONCERNING FEDERALLY SPONSORED RESEARCH AND DEVELOPMENT

Not applicable.

TECHNICAL FIELD

The present disclosure is described in the context of a conveyor assembly. More specifically, the present disclosure relates to a material buildup resistant sprocket configurable for use with a positively-driven conveyor belt.

BACKGROUND

Positively-driven conveyor belts are used in a number of applications where products or ingredients of products being conveyed are of a size and consistency that can lead to a buildup of material. Such material can build up within cavities and other open areas of the belt, as well as between teeth and other areas on a sprocket (e.g., a drive or idler sprocket). If material buildup prevents proper engagement between the conveyor belt and sprockets, such as the sprockets that drive the conveyor belt, the belt can jump or skip over a sprocket tooth, or repeatedly slip and cease to advance the belt even if the sprocket continues to rotate.

Therefore, in view of at least the above, a need exists for an improved sprocket that resists material buildup between sprocket teeth and other surfaces of the sprocket to promote and maintain engagement between the sprocket teeth and the belt.

SUMMARY

Some embodiments described herein provide a sprocket configured for use with a conveyor belt. The sprocket comprising a sprocket body having a central axis and defining an inner sprocket diameter and an outer sprocket diameter. The sprocket body comprising a hub, a webbing extending radially from the hub toward the outer sprocket diameter, and a plurality of teeth extending radially from the webbing and having an inner portion and an outer portion. At least one tooth of the plurality of teeth defines a thickness in an axial direction, the thickness varying between the inner portion and the outer portion.

In another embodiment, a sprocket configured for use with a conveyor belt and adapted to resist material buildup is provided. The sprocket comprising a hub having an inner sprocket diameter and an outer hub diameter, a webbing extending radially from the outer hub diameter, and at least one sprocket tooth extending radially from a sprocket root proximate the webbing, the sprocket root including a curved base. The curved base extends axially away from the webbing to a lateral surface of the at least one sprocket tooth.

In a further embodiment, a material buildup resistant sprocket is provided. The material buildup resistant sprocket comprising a sprocket body having an inner sprocket diameter and an outer sprocket diameter, a hub having an outer hub diameter and defining a hub height that extends in an axial direction, a webbing extending from the outer hub diameter and defining a web thickness in the axial direction, and a plurality of teeth that extend between the inner sprocket diameter and the outer sprocket diameter, the plurality of teeth defining a tooth thickness in the axial direction. The hub height is greater than the tooth thickness and the tooth thickness is greater than the web thickness.

BRIEF DESCRIPTION OF THE DRAWINGS

The following detailed description is to be read with reference to the figures, in which like elements in different figures have like reference numerals. The figures, which are not necessarily to scale, depict selected embodiments and are not intended to limit the scope of embodiments of the invention. Given the benefit of this disclosure, skilled artisans will recognize the examples provided herein have many useful alternatives that fall within the scope of the invention.

DETAILED DESCRIPTION

Figure 1:
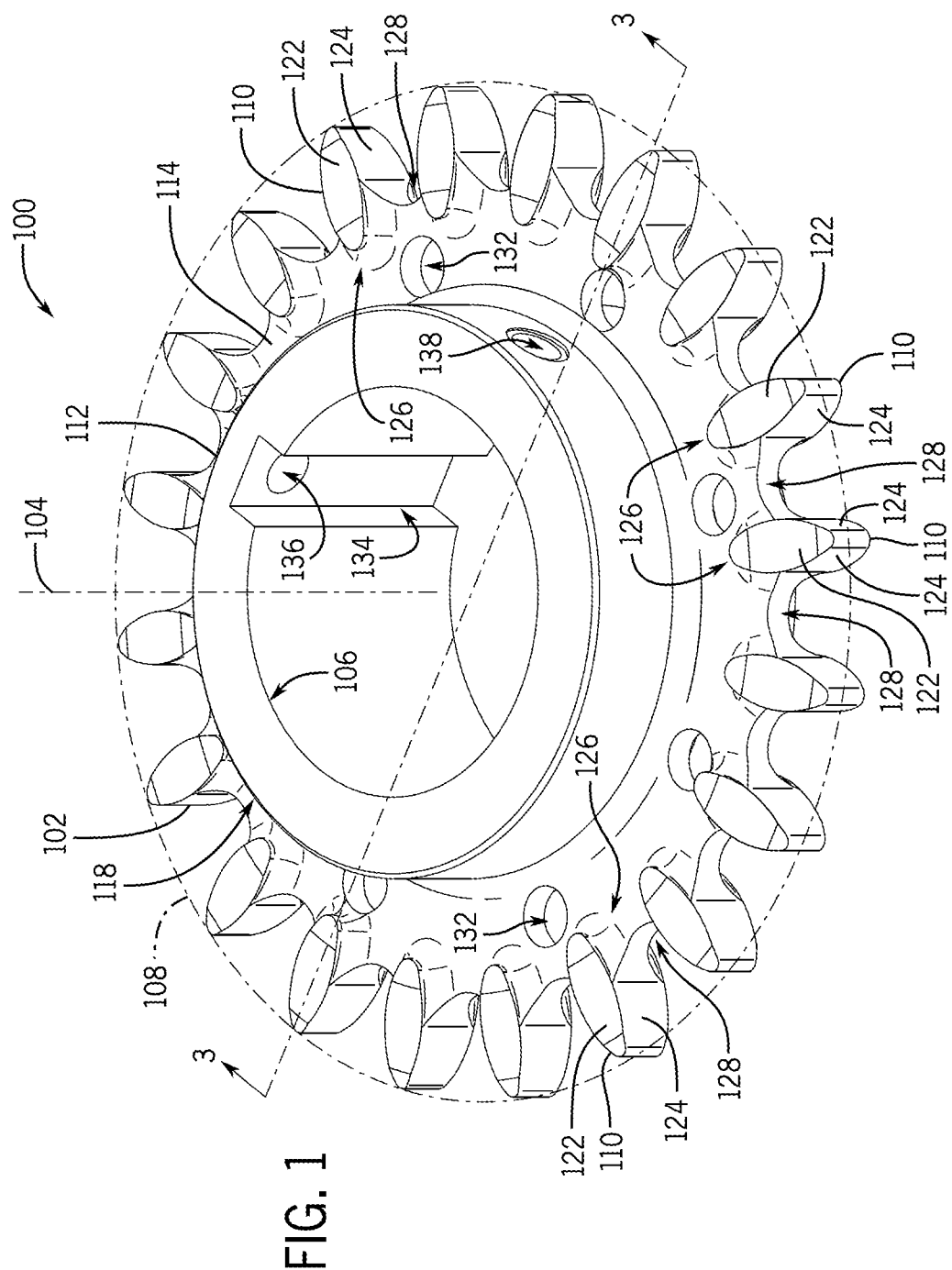
FIG. 1 is an isometric view of a sprocket according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled," and variations thereof, are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Given the benefit of this disclosure, various modifications to the illustrated embodiments will be readily apparent to those skilled in the art and the underlying principles herein can be applied to other embodiments and applications without departing from the invention. Thus, embodiments of the invention are not intended to be limited to embodiments shown, but are to be accorded the widest scope consistent with the principles and features disclosed herein.

As briefly described above, positively-driven conveyor belts are used in a number of applications where the products or ingredients of the products being conveyed can be the size and consistency that may promote buildup of material, not only within cavities and other open areas of the belt, but also between teeth and other areas on sprockets (e.g., drive sprockets, idler sprockets, and the like). Such buildup can become sufficient to prevent proper engagement between the belt and sprockets. For example, such buildup can cause the belt to jump or skip a sprocket tooth, or repeatedly slip so that the belt does not advance even when, for example, a drive sprocket continues to rotate.

Embodiments of the disclosure address these and other issues. For example, embodiments of the disclosure provide a sprocket geometry that resists and inhibits undesirable material buildup between sprocket teeth and on or between other surfaces of the sprocket to maintain proper engagement of the sprocket and the belt. In particular, embodiments of the invention provide a sprocket configured to promote engagement with a belt and reduce/inhibit material buildup while conveying material that may otherwise be susceptible to clumping, sticking, coating, or causing material buildup on the sprocket.

Further, embodiments of the invention provide a sprocket that may be produced by a variety of manufacturing processes, such as by a machining or an injection-molding process, for example. In general, aspects of embodiments of the invention include a sprocket with sprocket teeth having a width that is significantly larger than the thickness of a webbing that extends between the sprocket teeth. For example, in some instances the thickness of a sprocket tooth may be 3 to 4 times larger than the thickness of the webbing, while still maintaining a relatively wide tooth face. In general, maintaining a relatively wide tooth face can help reduce wear between sprocket and belt surfaces, such as at the locations between a tooth of a drive sprocket and a driven surface of a conveyor belt (e.g., hinge pin or other driven surface). The 3 to 4 times larger sprocket tooth thickness can facilitate the sprocket directly resisting and inhibiting buildup of foreign material, for instance, within a sprocket root.

In some embodiments, sprocket teeth can have a slight taper on both sides so that the tapered portion extends from a radius near the outer portion of the sprocket webbing through to a top of the tooth. In general, such taper can promote smooth engagement with a conveyor belt while allowing for a certain amount of functional lateral offset between the sprocket and a belt drive or engagement opening. Furthermore, in some embodiments, in a direction from the area where the sprocket teeth contact the outer webbing portion toward the center of the sprocket, there can be a "bell-mouth" tapered relief along the lower portion of each tooth that may allow material to flow away from the sprocket root, to further prevent and inhibit the packing of material along the sides of the sprocket and the sprocket root. Such tapered areas can also be radiused to eliminate or reduce sharp corners, which further prohibits material from collecting on the sprocket surfaces. In some embodiments, such radiused surfaces continue uninterrupted around a lower perimeter of each sprocket tooth.

As will be described in more detail below, sprockets according to embodiments of the invention may include a hub. The hub can feature a large inside radius that is configured to reduce or eliminate a location whereat material may be known to collect and build up. Holes may extend through the webbing of the sprocket to allow material to pass from one side of the sprocket to the other if necessary to reduce buildup, such as along an outer diameter of the sprocket hub, while still maintaining sufficient structural properties (e.g., stiffness, fatigue strength) of the sprocket in order to withstand the applied forces (e.g., torque) encountered during operation, such as the forces needed to drive a conveyor belt.

FIGS. 1-5 illustrate a sprocket 100 according to one example embodiment of the invention. The sprocket 100 is configured as a material buildup resistant sprocket and may be used, for instance, to drive a positively-driven conveyor belt (not shown) or as an idler sprocket, and may be used with a variety of conveyers (e.g., straight running, side-flexing, metallic, composite, plastic, etc.). With reference to FIG. 1, the sprocket 100 includes a sprocket body 102 having a central axis 104. The sprocket body 102 defines an inner sprocket diameter 106 and an outer sprocket diameter 108 relative to the central axis 104. The sprocket body 102 includes a plurality of teeth 110, each generally tangent (i.e., within normal manufacturing tolerance) to the outer sprocket diameter 108. The sprocket body further includes a hub 112 and a webbing 114. The hub 112 defines an outer hub diameter 118 relative to the central axis 104. The webbing 114 extends radially from the hub 112 near the outer hub diameter 118, and the plurality of teeth 110 extend radially from the webbing 114.

In the illustrated example, the sprocket 100 includes twenty sprocket teeth 110 arranged radially and evenly spaced about the central axis 104. In other embodiments, more or fewer teeth may be used in a sprocket configured as a material resistant sprocket. Generally, given the benefit of this disclosure, one skilled in the art will appreciate that the desired number and configuration of teeth are correlated to particular application requirements. For example, as will be described below with reference to FIGS. 6-10, a sprocket 200 includes a plurality of teeth 210. The plurality of teeth 210 include forty-one sprocket teeth. Similar to the plurality of teeth 110 of the sprocket 100, the plurality of teeth 210 of the sprocket 200 are arranged radially and evenly spaced about a central axis 204. Still, other sprocket configurations are possible. For example, a material buildup resistant sprocket can include similar geometries and dimensional ratios as the sprockets 100 and 200 with the same or varied number of teeth spaced about a central axis.

With continued reference to FIG. 1, each of the plurality of teeth 110 include opposing lateral surfaces 122 (though only a single lateral surface of each tooth 110 is visible in FIG. 1) and opposing medial surfaces 124. In general, each of the lateral surfaces 122 form a tapered profile, as will be described in greater detail below. The plurality of teeth 110 each extend from a respective sprocket root 126 that, in the example embodiment, is integrally formed with the webbing 114. The webbing 114 extends between the opposing medial surfaces 124 to form a concave web portion 128. In general, the concave web portion 128 defines a radius of curvature that is opposite (i.e., inverted) from the radius of curvature of the outer sprocket diameter 108. However, in other embodiments, the portion of the webbing 114 that extends between the opposing medial surfaces 124 may have other geometries, including convex or otherwise similar to the radius of curvature of the outer sprocket diameter 108.

Further illustrated in FIG. 1, the webbing 114 includes through holes 132 that extend axially (i.e., in a direction parallel to the central axis 104) through the webbing 114. The through holes 132 are configured to allow material to pass through to thereby reduce, inhibit, or prevent material buildup. For example, in use, the sprocket 100 may be used to drive a conveyor that is conveying material that is susceptible to clumping, catching, sticking, coating, or otherwise causing material buildup. If such material does move from the conveying surface of the conveyor toward the sprocket 100, the through holes 132 allow the material to pass through the sprocket body 102 without interrupting the driving abilities of the sprocket 100 and the engagement of the plurality of teeth 110 with the conveyor. In the illustrated embodiment, the through holes 132 are configured as a plurality of through holes 132 radially arranged in the webbing 114. The through holes 132 are spaced to provide a plurality of access points for unwanted material to move from one side of the sprocket body 102 to another to reduce, inhibit, or prevent material buildup while maintaining sufficient stiffness of the webbing 114, and thus, the sprocket body 102, to withstand applied forces (e.g., torque) required to drive a conveyor belt. In other embodiments, more or fewer through holes 132 of varying dimensions may extend through the webbing 114.

FIG. 1 further illustrates a keyway 134 formed in the hub 112 proximate to the inner sprocket diameter 106. The keyway 134 extends axially along the length of the hub 112 and radially toward the outer hub diameter 118. The keyway 134 includes keyway opening 136 (e.g., configured to threadably receive a setscrew) that extends through the hub 112 in the radial direction. The hub 112 also includes a hub opening 138 (e.g., configured to threadably receive a setscrew) that extends radially through the hub 112 from the inner sprocket diameter 106 to the outer hub diameter 118. In the illustrated embodiment, by way of example, the hub opening 138 is formed on one side of the sprocket body 102, while the portion of the hub 112 that extends to the other side of the sprocket body 102 may not include an opening (see, for example, FIG. 3).

Figure 2:
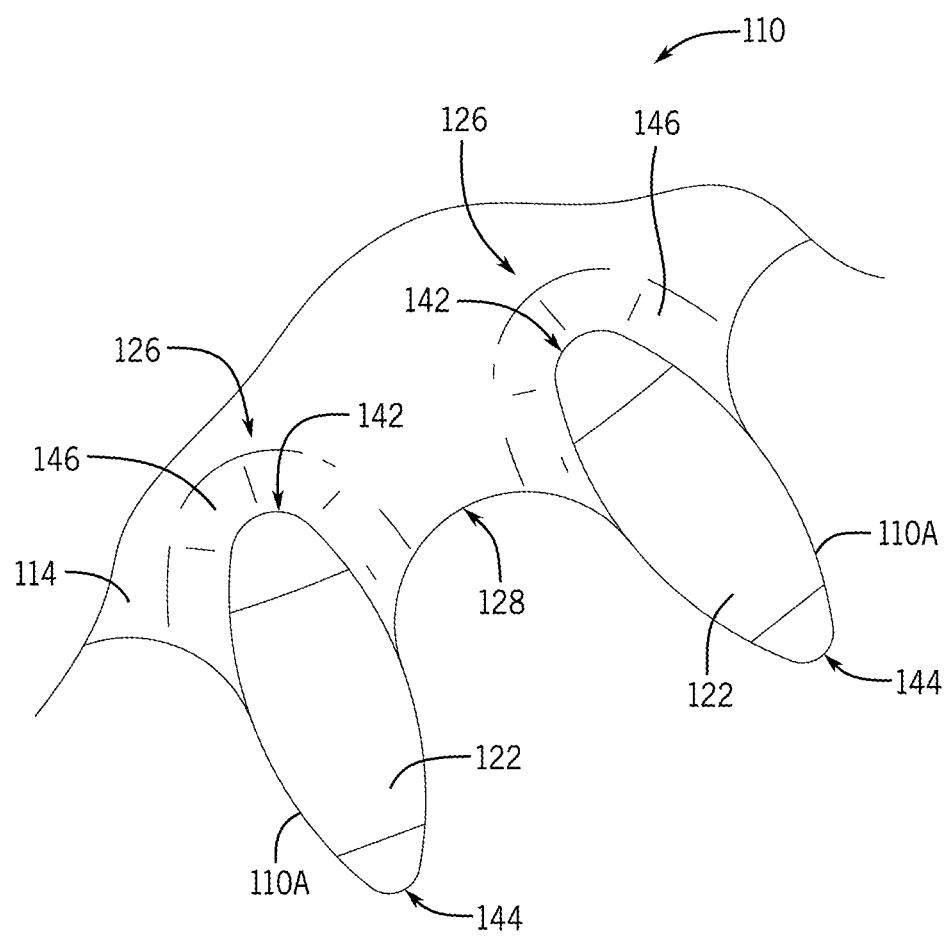
FIG. 2 is a detailed plan view of the sprocket of FIG. 1.
Figure 3:
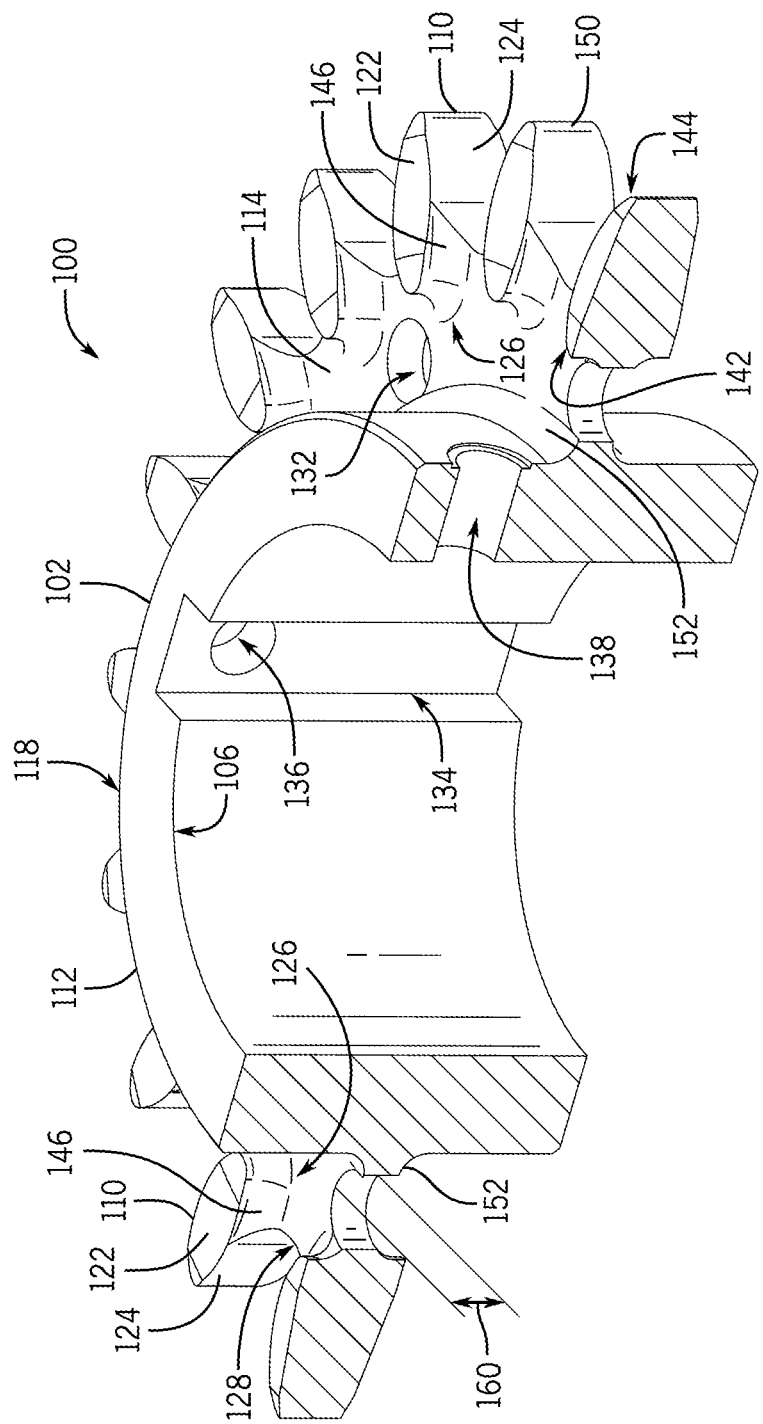
FIG. 3 is a cross-sectional isometric view of the sprocket of FIG. 1 taken along line 3-3.

FIG. 2 illustrates two representative teeth 110A of the plurality of teeth 110. While the following description is with reference to the teeth 110A, it should be understood that such description can apply to any of the plurality of teeth 110. As described above, the teeth 110A include the lateral surface 122. The lateral surface 122 extends between an inner portion 142 and an outer portion 144. Each sprocket root 126 includes a curved base 146 that extends between the webbing 114 and each tooth 110A proximate to the inner portion 142. The curved base 146 is configured as a tapered relief having a bell mouth-like shape, as shown in FIG. 3. The curved base 146 is configured to allow material to flow away from the sprocket root 126 which, in use, can reduce or prevent material buildup along the sides of the sprocket 100, including at the sprocket roots 126. Each curved base 146 continues uninterrupted around a lower perimeter of the teeth 110A proximate to the inner portion 142. In some forms, the curved base 146 may have a radius of curvature that is approximately 0.5 to 1.5 times a web thickness 160 (shown, for instance, in FIG. 5).

With reference to FIG. 3, each curved base 146 of the plurality of teeth 110 extends axially away from the webbing 114 to the lateral surface 122 of the teeth 110. The curved base 146 also extends radially to the lateral surface 122 proximate to the opposing medial surfaces 124 to form a continuous surface at each sprocket root 126. The smooth relief between the lateral surfaces 122 of the plurality of teeth 110 and the webbing 114 can facilitate the transition of unwanted material away from the plurality of teeth 110. Directing unwanted material to reduce or prevent material buildup on the sprocket body 102 can be particularly important near the teeth 110, such as at a tooth face 150, where the sprocket 100 engages the conveyor belt, and at the sprocket roots 126.

In general, material buildup at or around a conveyor engaging surface, such as the tooth face 150 or sprocket root 126, for example, can cause a tooth to slip while a sprocket drives, supports, or generally interfaces with a conveyor. In some circumstances, material buildup at or around a conveyor engaging surface can cause sprocket teeth to be disengaged from a conveyor such that the conveyor slips and ceases movement while the sprocket continues to rotate. As further illustrated in FIG. 3, each tooth face 150 of the plurality of teeth 110 forms a curved surface proximate to the outer portion 144 of the teeth 110. Each tooth face 150 defines a width suitable, based on the particular application requirements, for reducing wear between the sprocket 100 and conveyor belt surfaces.

Figure 4:
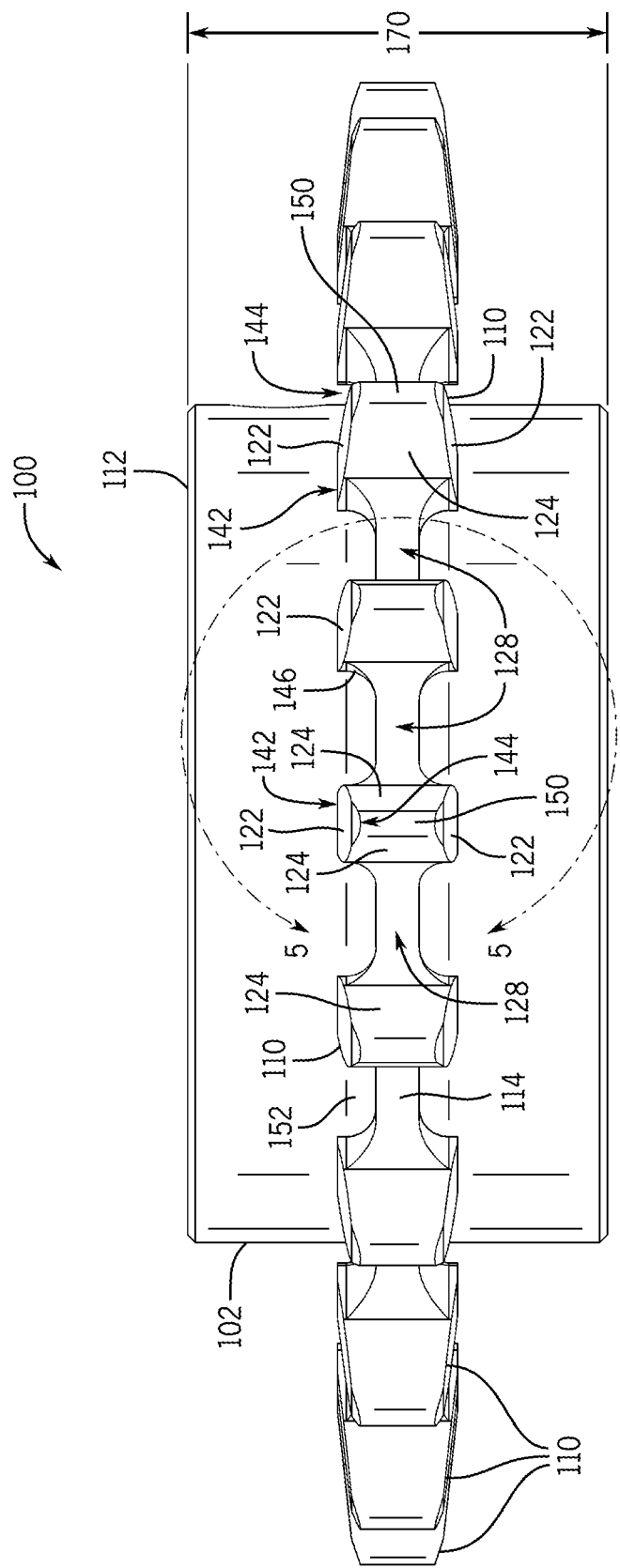
FIG. 4 is a radial side view of the sprocket of FIG. 1.
Figure 5:
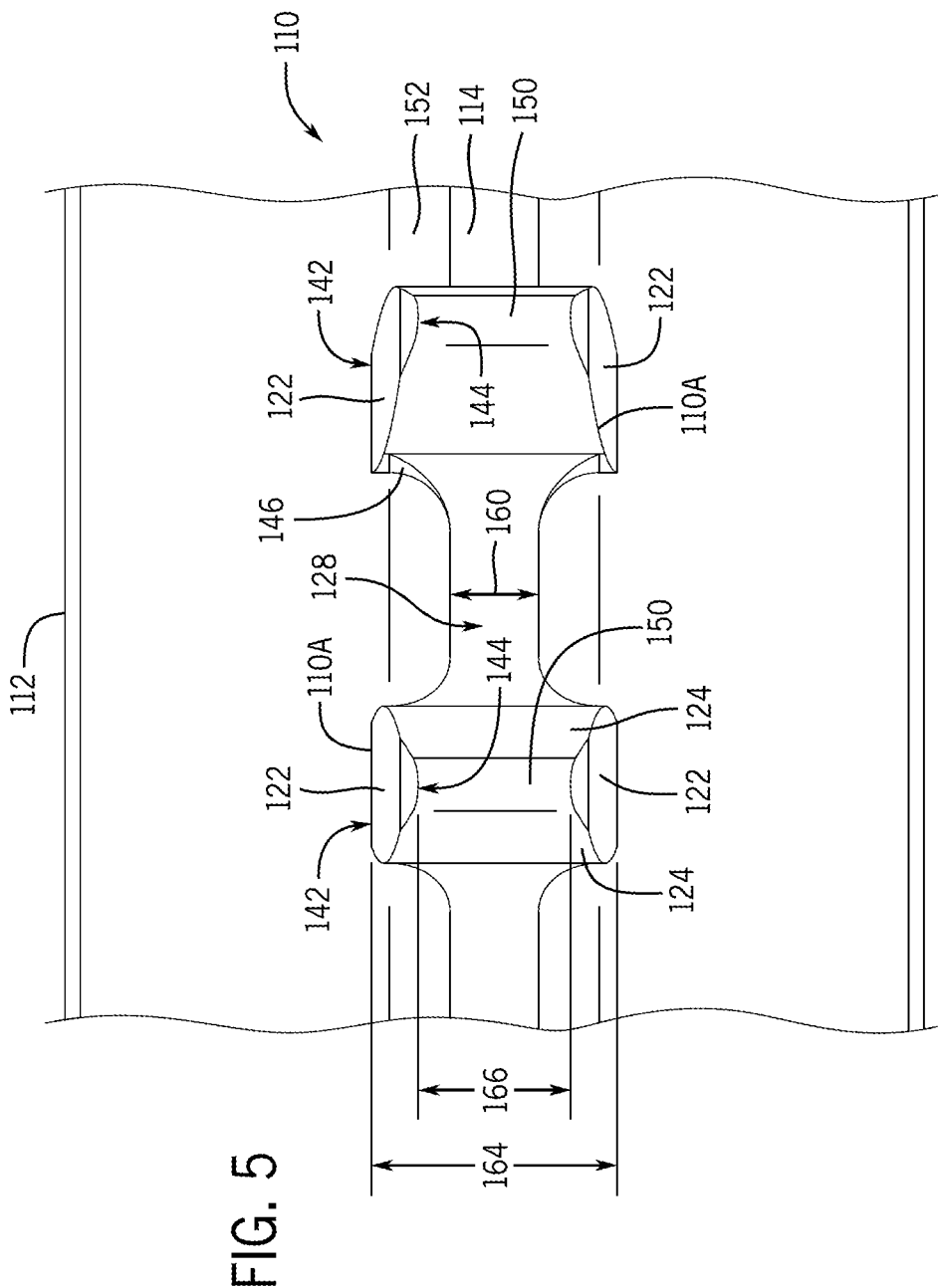
FIG. 5 is a detailed radial side view of the sprocket of FIG. 1.

With continued reference to FIG. 3, a curved interface 152 is formed on both sides of the sprocket body 102 between the hub 112 and the webbing 114. In general, the webbing 114 extends circumferentially about the hub 112 between the curved bases 146 of the plurality of teeth 110 and the curved interface 152. As shown in FIGS. 3-5, the webbing 114 defines the web thickness 160. The web thickness 160 is constant between the curved bases 146 of the plurality of teeth 110 and the curved interface 152. Thus, in a radial direction between two adjacent teeth 110 (i.e., proximate to the concave web portion 128), the webbing 114 is non-sloped (e.g., defines a generally constant axial thickness).

As further illustrated in FIGS. 4 and 5, each of the plurality of teeth 110 define a thickness in the axial direction. In particular, as briefly described above, each of the plurality of teeth 110 define a tapered profile. Therefore, the thickness of the teeth 110 in the axial direction varies along the radial direction. For example, each of the plurality of teeth 110 can define a first thickness proximate to the inner portion 142 and a second thickness proximate to the outer portion 144, the first thickness being different from the second thickness. The variable thickness of each of the plurality of teeth 110 will be described in further detail below. FIGS. 3-5 also illustrate a height 170 of the hub 112 in the axial direction. As shown, the hub height 170 is greater than the thickness of the teeth 110, which is greater than the web thickness 160.

FIG. 5 illustrates a detailed view of the two exemplary teeth 110A from a radial perspective of the sprocket 100. In particular, FIG. 5 illustrates the relative thicknesses of the plurality of teeth 110 and the webbing 114. As shown, each tooth 110A defines a maximum thickness 164 near the inner portion 142 and a minimum thickness 166 near the outer portion 144. In the illustrated embodiment, the variable thickness of the teeth 110 in the axial direction is between approximately 1 to 4 times the web thickness 160.

In some embodiments, the maximum thickness 164 of the teeth 110 is approximately 2 to 4 times the web thickness 160, or the maximum thickness 164 of the teeth 110 is approximately 2.5 to 3.5 times the web thickness 160. Likewise, in some embodiments, the minimum thickness 166 of the teeth 110 is approximately 1 to 2 times the web thickness 160, or the minimum thickness 166 of the teeth 110 is approximately 1.1 to 1.5 times the web thickness 160. The slope of the teeth 110 from the maximum thickness 164 to the minimum thickness 166 is approximately 1.25:1, and in some embodiments 1.05:1 or 1.50:1.

As briefly discussed above, the number of teeth in the plurality of teeth 110 of the sprocket 100 is by way of example. In other embodiments, more or fewer teeth on a sprocket are possible. Additionally, in other embodiments, other sprocket configurations are possible, such as variations in hub height, hub thickness (e.g., from an inner hub diameter to an outer hub diameter), sprocket inner diameter, sprocket outer diameter, radial distance between a curved base at a root of a tooth and a curved interface between a webbing and a hub, hub through hole diameter, tooth height (e.g., the distance from a base of the inner portion to a tip of the outer portion), etc., while maintaining similar geometric characteristics of the sprocket 100, such as a ratio between a tooth thickness and a webbing thickness, for instance.

By way of example, FIGS. 6-10 illustrate the sprocket 200 according to another example embodiment of the invention. The sprocket 200 has similar characteristics to the sprocket 100, therefore, like reference numbers will be used in the following description of the sprocket 200.

Figure 6:
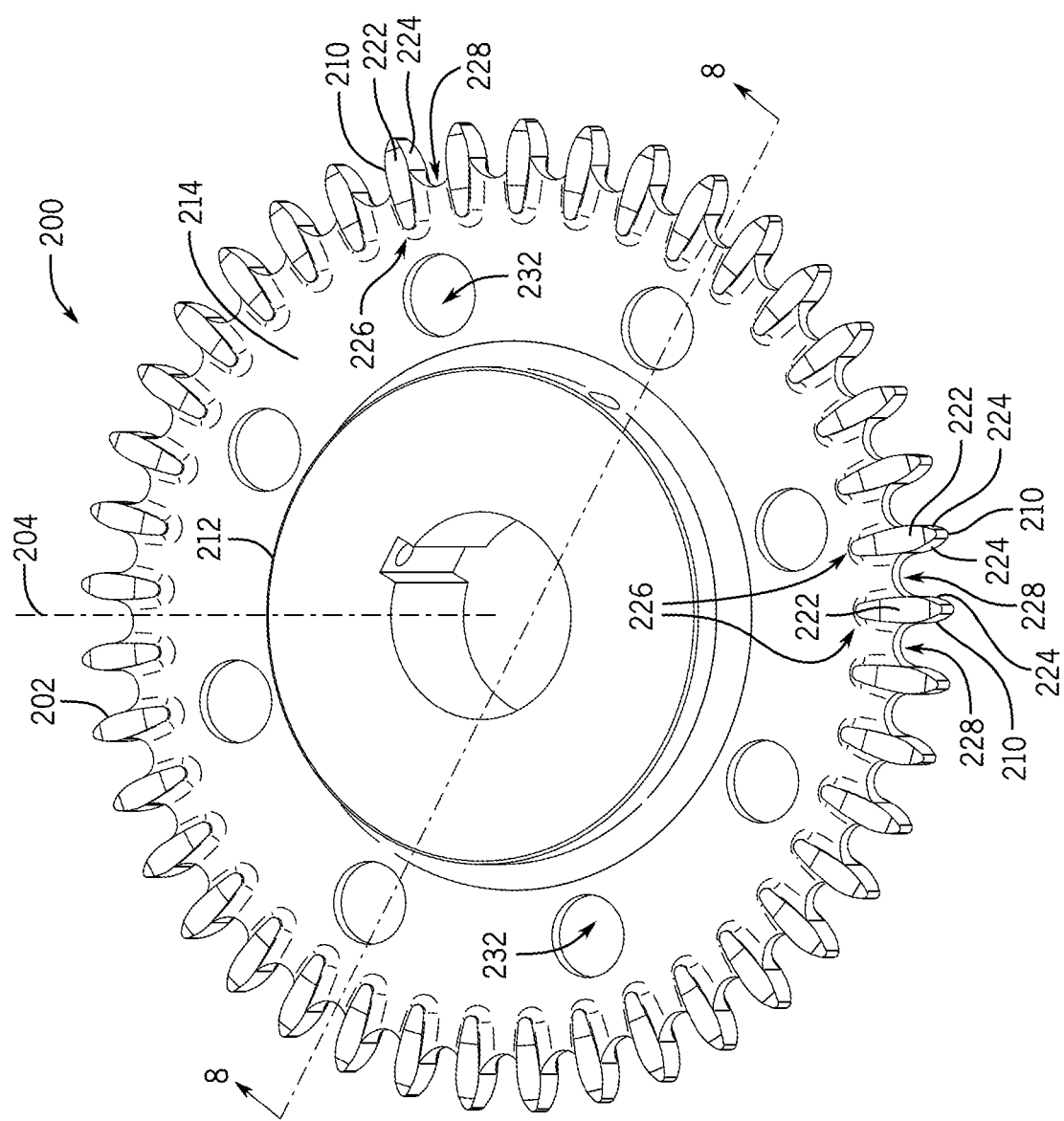
FIG. 6 is an isometric view of a sprocket according to another embodiment of the invention.

The sprocket 200 is configured as a material resistant sprocket and can be used to, for example, drive a positively-driven conveyor belt (not shown). With reference to FIG. 6, the sprocket 200 includes a sprocket body 202 having a central axis 204. The sprocket body 202 defines an inner sprocket diameter and an outer sprocket diameter. The sprocket body 202 includes the plurality of teeth 210, each generally tangent to the outer sprocket diameter. The sprocket body further includes a hub 212 and a webbing 214. The hub 212 defines an outer hub diameter. The webbing 214 extends radially from the hub 212 at the outer hub diameter, and the plurality of teeth 210 extend radially from the webbing 214.

With continued reference to FIG. 6, each of the plurality of teeth 210 include opposing lateral surfaces 222 (though only a single lateral surface of each tooth 210 is visible in FIG. 6) and opposing medial surfaces 224. The plurality of teeth 210 each extend from a respective sprocket root 226 integrally formed, for instance, with the webbing 214. The webbing 214 extends between the opposing medial surfaces 224 to form a concave web portion 228. The webbing 214 includes through holes 232 that extend axially through the webbing 214. The through holes 232, like the through holes 132, are configured to allow material to pass through to thereby reduce, inhibit, or prevent material buildup.

FIG. 6 further illustrates a keyway formed in the hub 212 proximate to the inner sprocket diameter. The hub 212 also includes a hub opening configured as a hole that extends radially through the hub 212 from the inner sprocket diameter to the outer hub diameter. In the illustrated embodiment, by way of example, the hub opening is formed on one side of the sprocket body 202, while the portion of the hub 212 that extends to the other side of the sprocket body 202 may not include an opening (see, for example, FIG. 8).

Figure 7:
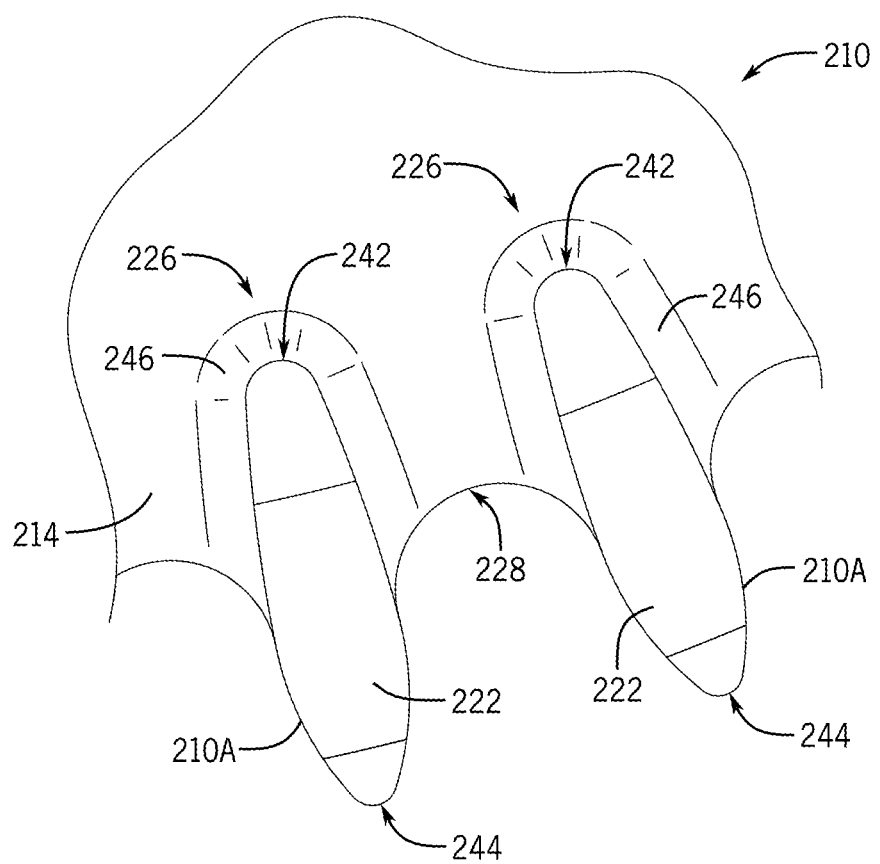
FIG. 7 is a detailed plan view of the sprocket of FIG. 6.
Figure 8:
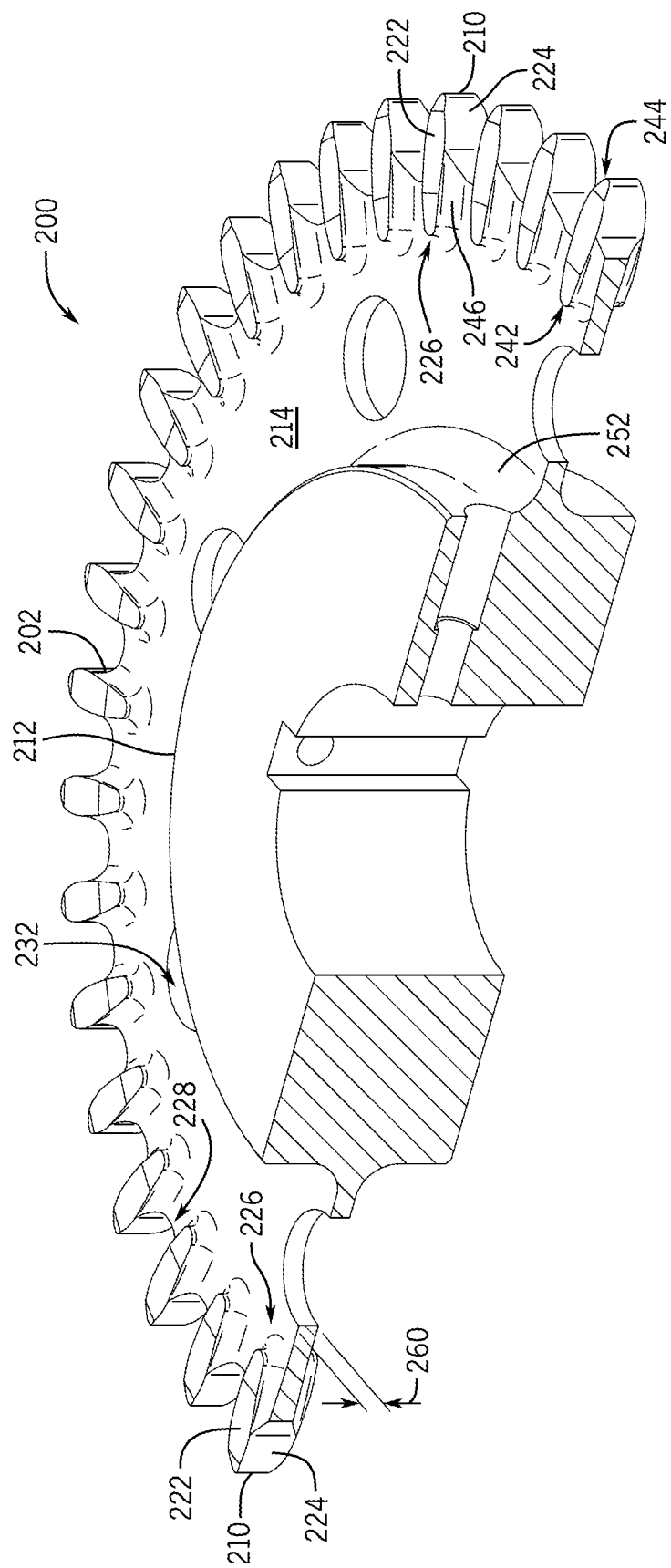
FIG. 8 is a cross-sectional isometric view of the sprocket of FIG. 6 taken along line 8-8.

FIG. 7 illustrates two representative teeth 210A of the plurality of teeth 210. The lateral surface 222 extends between an inner portion 242 and an outer portion 244. Each sprocket root 226 includes a curved base 246 that extends between the webbing 214 and each tooth 210A proximate to the inner portion 242. The curved base 246 is configured as a tapered relief having a bell mouth-like shape, as shown in FIG. 8. The curved base 246 is configured to allow material to flow away from the sprocket root 226 which, in use, may reduce or prevent material buildup along the sides of the sprocket 200, including at the sprocket roots 226. Each curved base 246 continues uninterrupted around a lower perimeter of the teeth 210A proximate to the inner portion 242. In some forms, the curved base 246 may have a radius of curvature that is approximately 0.5 to 1.5 times a web thickness 260 (shown, for instance, in FIG. 10).

Figure 9:
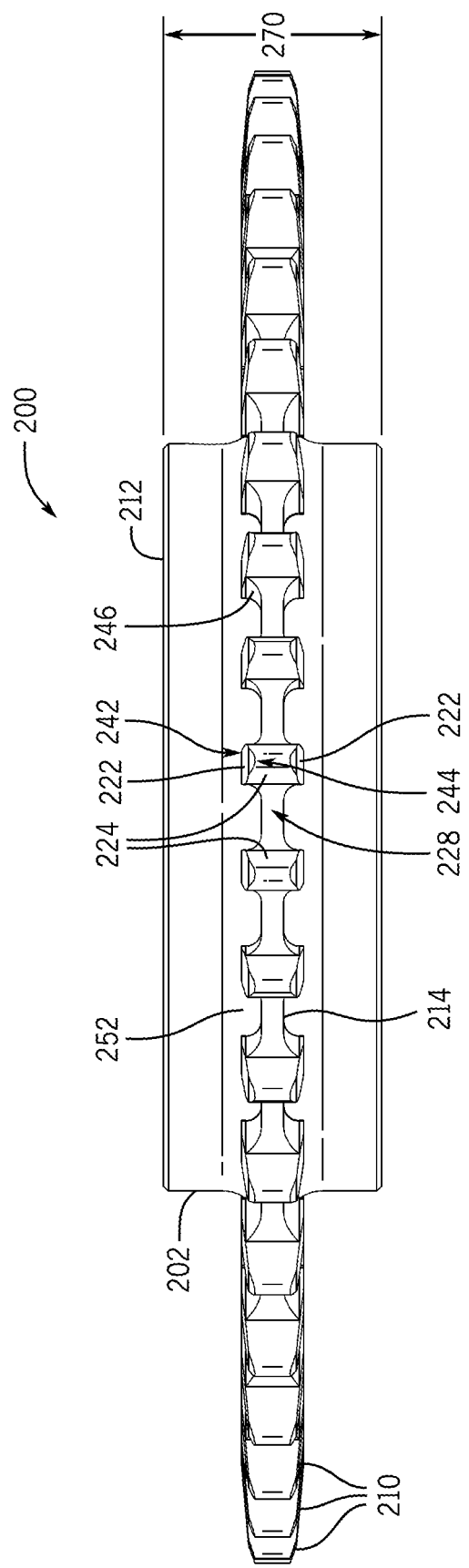
FIG. 9 is a radial side view of the sprocket of FIG. 6.
Figure 10:
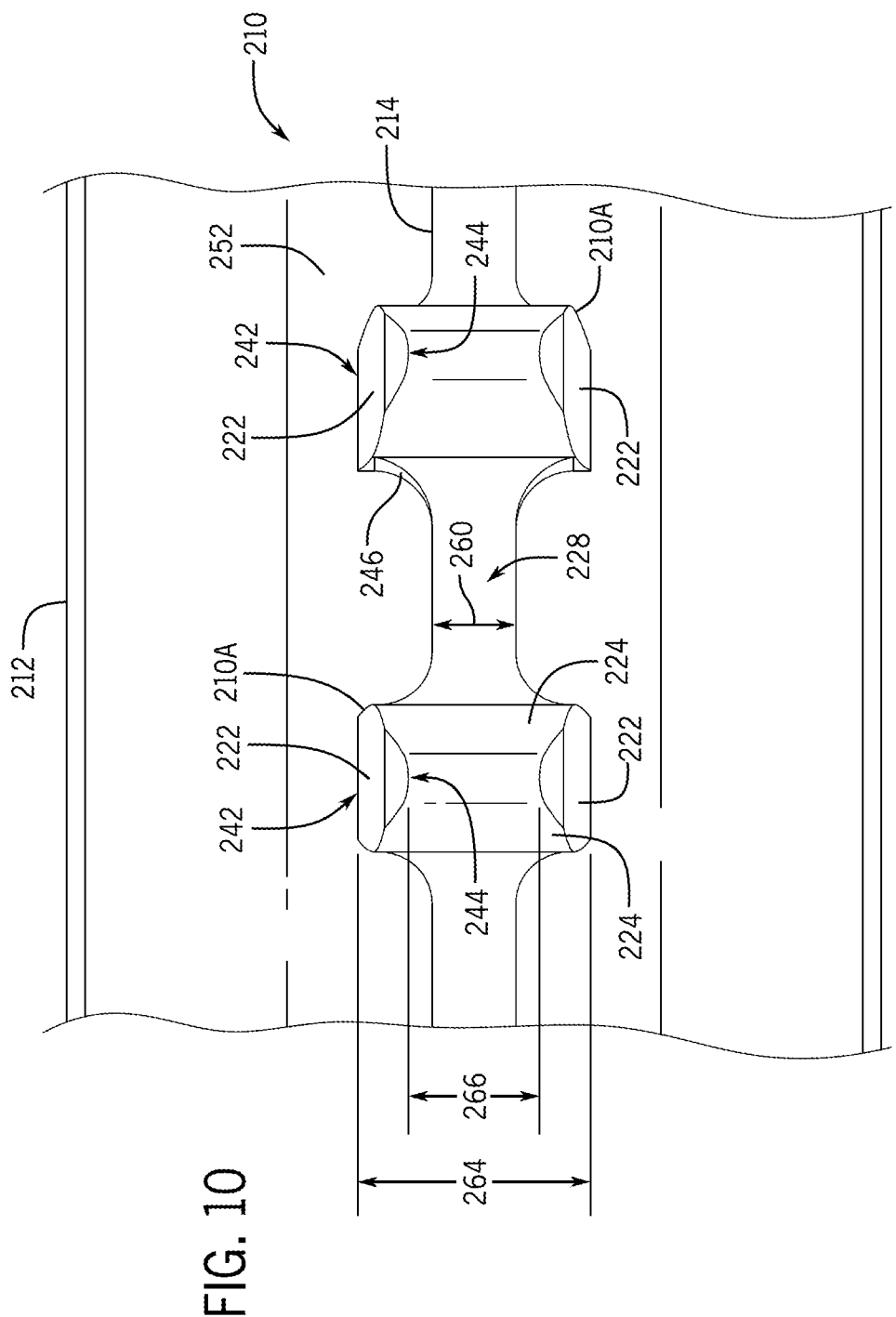
FIG. 10 is a detailed radial side view of the sprocket of FIG. 6.

With reference to FIG. 8, each curved base 246 of the plurality of teeth 210 extends axially away from the webbing 214 toward the lateral surface 222 of the teeth 210. The curved base 246 also extends radially to the lateral surface 222 proximate to the opposing medial surfaces 224 to form a continuous surface at each sprocket root 226. A curved interface 252 is formed on both sides of the sprocket body 202 between the hub 212 and the webbing 214. In general, the webbing 214 extends circumferentially about the hub 212 between the curved bases 246 of the plurality of teeth 210 and the curved interface 252. As shown in FIGS. 8-10, the webbing 214 defines the web thickness 260. The web thickness 260 is generally constant between the curved bases 246 of the plurality of teeth 210 and the curved interface 252.

As further illustrated in FIGS. 9 and 10, each of the plurality of teeth 210 define a thickness in the axial direction. In particular, as briefly described above, each of the plurality of teeth 210 define a tapered profile, therefore, the thickness of the teeth 210 in the axial direction varies along the radial direction. FIGS. 8-10 also illustrate a height 270 of the hub 212 in the axial direction. As shown, the hub height 270 is greater than the thickness of the teeth 210, which is greater than the web thickness 260.

FIG. 10 illustrates a detailed view of the two exemplary teeth 210A from a radial perspective of the sprocket 200. In particular, FIG. 10 illustrates the relative thicknesses of the plurality of teeth 210 and the webbing 214. As shown, each tooth 210A defines a maximum thickness 264 near the inner portion 242 and a minimum thickness 266 near the outer portion 244. In the illustrated embodiment, the variable thickness of the teeth 210 in the axial direction is between approximately 1 to 4 times the web thickness 160.

In the illustrated embodiment, the maximum thickness 264 of the teeth 210 is approximately 2 to 4 times the web thickness 260, or the maximum thickness 264 of the teeth 210 is approximately 3 times the web thickness 260. Likewise, in some embodiments, the minimum thickness 266 of the teeth 210 is approximately 1 to 2 times the web thickness 260, or the minimum thickness 266 of the teeth 210 is approximately 1.1 to 1.5 times the web thickness 260. The slope of the teeth 210 from the maximum thickness 264 to the minimum thickness 266 is approximately 1.25:1, and in some embodiments 1.05:1 or 1.50:1.

It will be appreciated by those skilled in the art that while the invention has been described above in connection with particular embodiments and examples, the invention is not necessarily so limited, and that numerous other embodiments, examples, uses, modifications, and departures from the embodiments, examples, and uses are intended to be encompassed by the claims attached hereto. For example, the spacing, size, orientation, shape, and other features may vary based on application-specific requirements (e.g., product to be conveyed, environmental factors, speed of conveyance, etc.). In addition, while the embodiments have been described in context of a metallic construction, it is contemplated that other materials (e.g., polymers) or composite constructions (e.g., a metallic base with a plastic overmold) are possible for both the sprockets. Furthermore, other types of conveyor belts may also benefit from the incorporation of aspects of the invention. The entire disclosure of each patent and publication cited herein is incorporated by reference, as if each such patent or publication were individually incorporated by reference herein.

Various features and advantages of the invention are set forth in the following claims.

The invention claimed is:

1. A material buildup resistant sprocket, the material buildup resistant sprocket comprising:

a sprocket body having an inner sprocket diameter and an outer sprocket diameter;

a hub having an outer hub diameter and defining a hub height that extends in an axial direction;

a webbing extending from the outer hub diameter and defining a web thickness in the axial direction; and a plurality of teeth that extend between the inner sprocket diameter and the outer sprocket diameter, the plurality of teeth defining a tooth thickness in the axial direction in which the tooth thickness varies between a radially inner portion on a lateral face of each tooth in the plurality of teeth and a radially outer portion on the lateral face of each tooth in the plurality of teeth, wherein the tooth thickness is greater than the web thickness;

wherein each tooth in the plurality of teeth extends radially from a corresponding sprocket root proximate the webbing, the sprocket root including a curved base that extends axially away from the webbing to the lateral surface of each tooth.

2. The material buildup resistant sprocket of claim 1, wherein the tooth thickness at the radially inner portion is a maximum thickness and the thickness at the radially outer portion is a minimum thickness.

3. The material buildup resistant sprocket of claim 2, wherein the maximum thickness is between 2 and 4 times the web thickness.

4. The material buildup resistant sprocket of claim 1, wherein the plurality of teeth each include opposing lateral surfaces and opposing medial surfaces, the webbing extending from the opposing medial surfaces to form a concave web portion.

5. The material buildup resistant sprocket of claim 1, wherein a tapered relief extends between the webbing and the at least one tooth proximate to the inner portion.

6. The material buildup resistant sprocket of claim 1, wherein the plurality of sprocket teeth radially extend from the webbing and away from the outer hub diameter.

7. The material buildup resistant sprocket of claim 1, wherein:

the lateral surface extends radially between the radially inner portion and the radially outer portion;

each tooth defining a first thickness proximate to the radially inner portion and a second thickness proximate to the radially outer portion; and the first thickness is greater than the second thickness.

8. The material buildup resistant sprocket of claim 1, wherein the web thickness is constant in a radial direction.

9. The material buildup resistant sprocket of claim 1, wherein the webbing includes through holes configured to allow material to pass through to thereby prevent material buildup.

10. The material buildup resistant sprocket of claim 1, wherein the plurality of teeth include opposing tapered surfaces that extend in a radial direction.

11. The material buildup resistant sprocket of claim 1, wherein each of the plurality of teeth include a respective tooth face at the outer sprocket diameter, each respective tooth face configured as a curved surface.

* * * * *